United States Patent
Hamilton et al.

(10) Patent No.: US 6,389,552 B1
(45) Date of Patent: May 14, 2002

(54) METHODS AND SYSTEMS FOR REMOTE ELECTRONIC VAULTING

(75) Inventors: Bruce Hamilton, Rochelle Park, NJ (US); Douglas N. Weldon, Longwood, FL (US)

(73) Assignee: AT&T Corp, New York, NY (US)

( * ) Notice: Subject to any disclaimer, the term of this patent is extended or adjusted under 35 U.S.C. 154(b) by 0 days.

(21) Appl. No.: 09/224,707

(22) Filed: Dec. 31, 1998

(51) Int. Cl.$^7$ .................................................. G06F 11/00
(52) U.S. Cl. ........................... 714/4; 714/6; 707/202; 707/204; 379/84
(58) Field of Search ................... 714/4, 6, 13; 707/202, 707/204; 711/162; 379/84

(56) References Cited

U.S. PATENT DOCUMENTS

| | | | | |
|---|---|---|---|---|
| 5,644,698 A | * | 7/1997 | Cannon | 714/6 |
| 5,781,909 A | | 7/1998 | Logan et al. | |
| 5,790,801 A | | 8/1998 | Funato | |
| 5,799,147 A | * | 8/1998 | Shannon | 714/6 |
| 5,949,970 A | * | 9/1999 | Sipple et al. | 714/15 |
| 6,044,444 A | * | 3/2000 | Ofek | 711/162 |
| 6,088,328 A | * | 7/2000 | McKnight | 370/216 |
| 6,111,852 A | * | 8/2000 | Leung et al. | 370/217 |
| 6,144,999 A | * | 11/2000 | Khalidi et al. | 709/219 |
| 6,145,088 A | * | 11/2000 | Stevens | 714/2 |
| 6,151,137 A | * | 11/2000 | Henrick | 358/434 |
| 6,163,856 A | * | 12/2000 | Dion et al. | 714/4 |
| 6,243,394 B1 | * | 6/2001 | Deng | 370/466 |

OTHER PUBLICATIONS www.computeruser.com/resources/dictionary, Definition for: Point of Presence.*
http://www.emc.com, Dec. 2, 1998.

* cited by examiner

Primary Examiner—Scott T. Baderman

(57) ABSTRACT

By using advanced data communications transport methodology, remote electronic vaulting systems and methods provide a networked-based solution to facilitate the transportation of production data between the production data processing center and an off-site storage location. A local access network is used to facilitate data transport from the production data processing facility to the closest long-haul distance network point of presence facility. The point of presence facility houses an electronic storage device which provides the off-site storage capability. A user can then manipulate transportation to data from the production data processing center to the data storage facility using channel extension technology to store the data in electronic form on standard disk or tape storage devices. The user can then recall, copy or transmit the data anywhere on demand under user control by manipulating switching at the point of presence. This subsequent electronic data transfer can be designed to move the critical data on demand at time of disaster to any disaster recovery facility.

25 Claims, 6 Drawing Sheets

METHODS AND SYSTEMS FOR REMOTE ELECTRONIC VAULTING

BACKGROUND OF THE INVENTION

1. Field of Invention

This invention relates to methods and systems for off-site storage of data. Specifically, this invention relates to systems and methods for backing-up data to a remote location collocated at a point of presence.

2. Description of Related Art

Off-site storage is primarily handled by what is known as "tape and truck" technology. At some regularly scheduled interval, disaster recovery data back-up tapes are created by transferring all or part of a quantity of data to magnetic media such as tapes. These tapes are then packaged and couriered, for example by an employee or courier service, to a secure, off-site storage location. Typically, this off-site storage location inventories, files and stores the back-up tapes until they are needed.

More technologically-advanced alternatives to the tape and truck method are being implemented on a limited basis. However, the cost and the extent of implementing these alternatives and their effectiveness, is directly proportional to the data communication transport device used. Furthermore, these alternatives are generally implemented on dedicated data communications paths. With these dedicated data backup methods, the systems are usually highly customized and tailored to meet each individual customer's needs. Accordingly, these alternative systems are usually very costly and are limited to a particular predetermined recovery scenario in the event a back-up from the stored data is desired.

SUMMARY OF THE INVENTION

The invention provides a remote electronic vaulting system for back-up and recover of data. This system comprises at least one production site, where the data is generated, at least one local access network, at least one off-site storage facility, collocated at a point of presence, a recovery site and, optionally, a plurality of alternate recovery sites and at least one long-haul network.

Data back-up and recovery occurs in an electronic network-based architecture. This architecture provides a secure, highly-efficient and flexible means of data transport, storage and/or retrieval that eliminates potential defects in information back-up creation. By providing greater user control of critical information back-up and recovery, restoration time can be reduced. Furthermore, the methods and systems of this invention provide the ability to reduce or eliminate stranded information, i.e., information that is lost between the last data back-up event and the actual time of disaster. Since back-up data is stored "in the network" by means of a collocated electronic storage device, speed, flexibility and cost can all be optimized.

Additionally by collocating the electronic storage device "in the network," for example, at the point of presence, recovery of data to a plurality of recovery sites is easily accomplished. Thus, the remote electronic vaulting system allows for a plurality of different data recovery scenarios that, in the event of a disaster, can be implemented or altered based on a particular user's needs.

In this way, the remote electronic vaulting system provides the flexibility of utilization of multiple alternative disaster recovery facilities at the time of disaster.

BRIEF DESCRIPTION OF THE DRAWINGS

The preferred embodiments of this invention will be described in detail, with reference to the following figures, wherein.

DETAILED DESCRIPTION OF PREFERRED EMBODIMENTS

Figure 1:
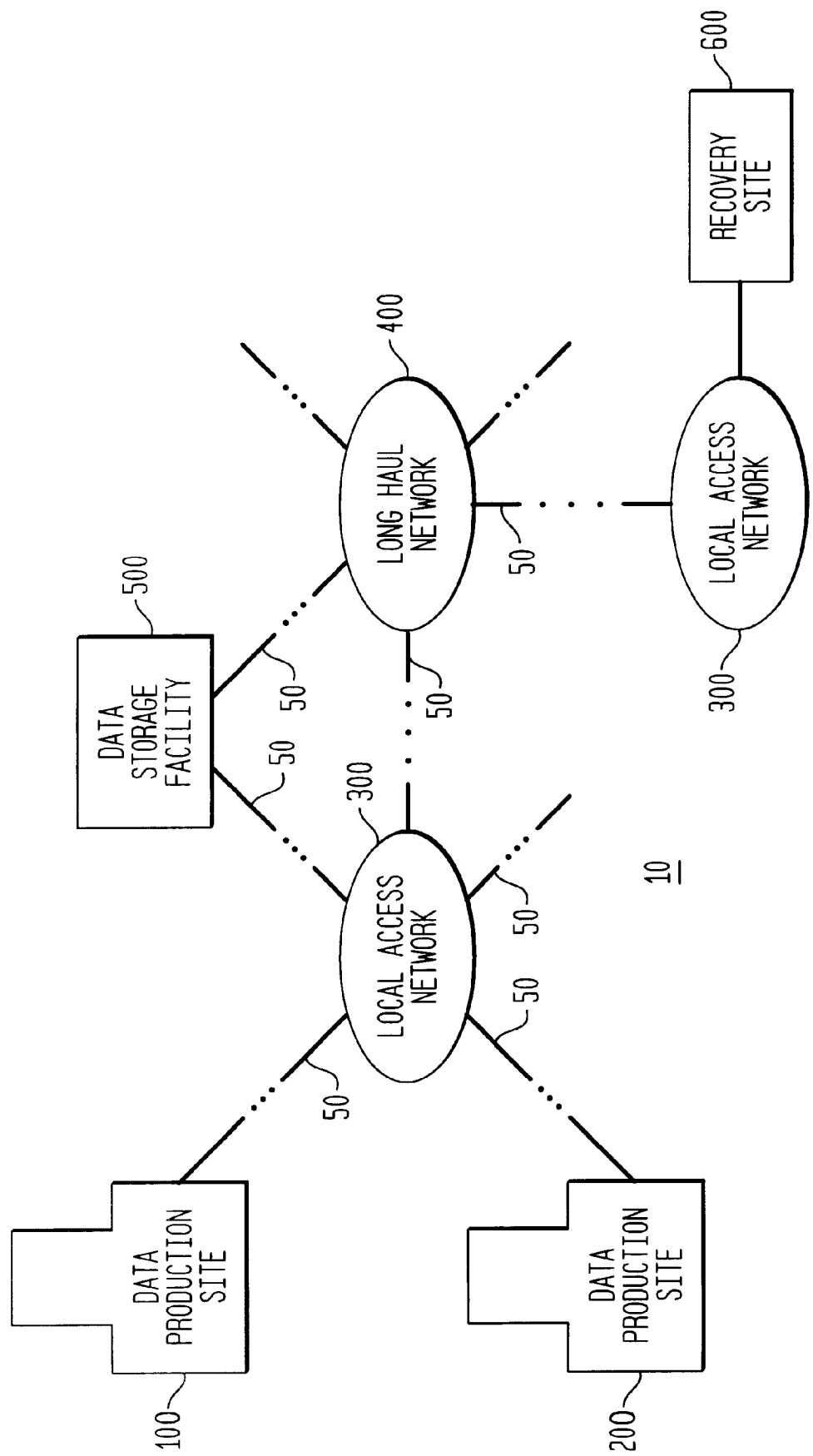
FIG. 1 shows a first exemplary embodiment of the remote electronic vaulting system according to this invention.

FIG. 1. shows a block diagram of a remote electronic vaulting system 10 that includes at least one data production site 100, one or more local access networks 300, a long-haul network 400, a data storage facility 500 and at least one recovery site 600. Optionally, the remote electronic vaulting system 10 can include additional data production sites, such as the data production site 200, as well as a plurality of recovery sites. The data production site 100 and the recovery site 600 are connectable to the data storage facility 500 via a link 50 and at least one of the local access networks 300, or via at least one of the local access networks 300 and at least one long-haul network 400.

The link 50 can be any known or later developed device or system for connecting the data production site 100 and/or 200, the local access networks 300, the data storage facility 500, the long-haul network 400 and/or the one or more recovery sites 600. Thus, the link 50 can be a wired or wireless link, including fiber optic cable, or any other known or later-developed structure usable to connect the various networks and data sites of this invention.

To protect critical information assets of a corporation, government agency or other private or public enterprise from accidental losses due to unexpected events, especially in today's highly mechanized data processing environments, copies of production data must be made on a regular basis. Backing-up the production data is typically a two-part process: 1) a production copy is made and typically stored at the production location. This copy is used to facilitate recovery from relatively small failures, such as brief power outages; and 2) a disaster recovery copy is made, e.g., the "tape" in the "tape and truck method." The disaster recover copy is stored in an off-site location to support recovery from larger catastrophic events. This back-up production data is the most essential element of disaster recovery planning in order to ensure timely and effective recovery from any failure. Industry-wide, missing, damaged, or inaccurate back-ups are the single biggest cause of disaster recovery plan failures.

The remote electronic vaulting systems and methods of this invention facilitate the transport of production data between the data production sites 100 and/or 200 and the off-site data storage facility 500 using advanced data communications transport technology. By creating a local access network-based data transport capability from the data production sites 100 and/or 200 to the data storage facility 500, back-up production data can be stored "in the network" to optimize speed, flexibility and cost. The data storage facility 500 is collocated with one of the local access networks 300. Having the data storage facility 500 collocated with the local access network 300 enables the user to transfer critical data electronically from the data production sites 100 and/or 200 to any of a plurality of recovery sites 600 using, for example, the long-haul network 400. For example, the data transfer for a recovery operation can be designed to transport the critical data on demand at the time of disaster to any pre-identified disaster recovery site 600. For example, the data production site 100 could have a disaster recovery plan that, either automatically, or initiated by a user at a remote location, e.g., the recovery site, transports the data to the recovery site 600 in the case of a major impact event, or transports the data back to the original production site 100 in the case of a limited impact event.

When the production site 100 backs-up data to the data storage facility 500, the data is transported via the communication link 50 to the local access network 300. Since the local access network 300 is collocated with the data storage facility 500, the long-haul network 400 does not need to be involved in the routine data back-ups. However, it should be appreciated that the long-haul network could 400 be involved in a back-up scenario. For example, assume a major impact event has occurred and data production site 100 is unavailable for one week. At the time of the disaster, the backed-up data is transferred from the data storage facility 500 to the recovery site 600. The recovery site 600 then becomes the primary data production site for the week that the data production site 100 is unavailable. During that week, the recovery site 600 could perform its backups to the data storage facility 500 via the link 50, the one or more local access networks 300 and the long-haul network 400.

Additionally, for example, in the event of a limited impact event, a user at the data production site 100 can request the back-up data directly from the data storage facility 500. Assuming the local access network 300 is available, the backed-up data can easily be transmitted back to the data production site 100. However, in the event of a major impact event, for example, where the local access network 300 may not be available, a user at the recovery site 600 can access, via their local access network 300, and the long-haul network 400, the back-up data stored at the data storage facility 500. For example, a user at the recovery site 600 can be supplied with a password and the necessary network information to "log on" to the data storage facility 500. The user can then retrieve the back-up data to the recovery site.

Alternatively, if, for some reason, the data production site 100 is unavailable, a user could opt to restore the data from the data storage facility 500 to the data production site 200.

It should be appreciated that the methods for routing production data and recovering data are not limited to those methods described above. The methods for backing-up and recovering data are only limited by the particular needs of an individual user.

Figure 2:
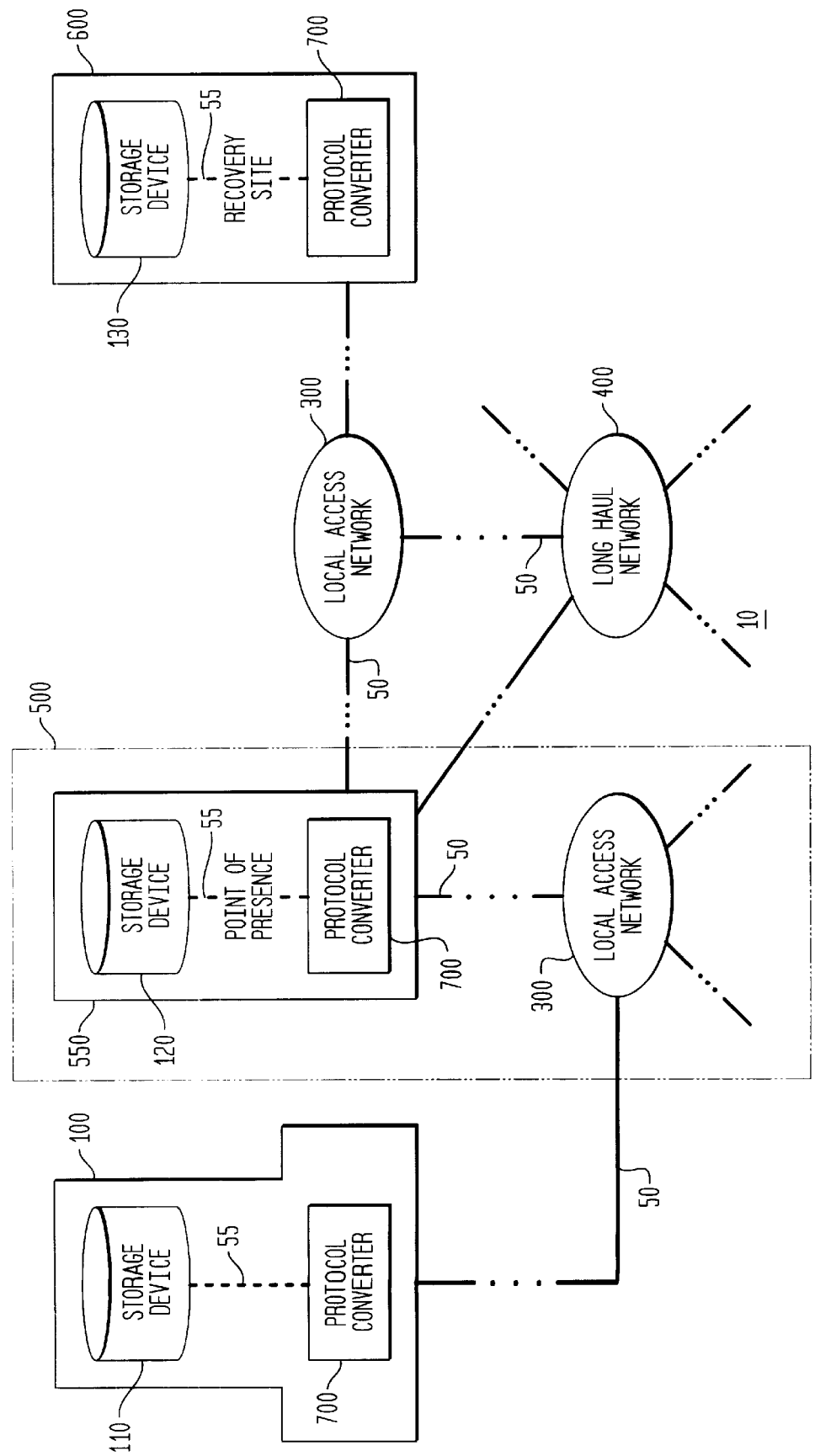
FIG. 2 shows a second exemplary embodiment of the remote electronic vaulting system according to this invention.

FIG. 2 illustrates the remote electronic vaulting system 10 in greater detail. Specifically, the remote electronic vaulting system 10 further comprises a plurality of local data storage devices 110, 120 and 130 and a plurality of protocol converters 700. The local data storage devices 110–130 can be any known or later-developed storage device, such as a hard disk drive and disk, a magneto-optic disk drive and disk, an optical disk drive and disk, RAM or any other volatile or nonvolatile memory device, magnetic tape, or any other known or later-developed device capable of storing data.

The local data storage device 110 stores data generated by the data production site 100. For example, the data production site 100 can be either a stand-alone personal computer, or a plurality of personal computers interconnected via a local area network, a wide area network, and/or the Internet. Thus, the local data storage device 110 only need be capable of storing the data from the data production site 100 that is eventually intended for back-up.

The local data storage device 120, which is collocated with the point of presence 550, stores data backed-up from the data production site 100. The local data storage device 130 stores data that is recovered from the data storage facility 500 to the recovery site 600.

The links 55 connect the various local data storage devices to the protocol converter 700. The links 55 can be any known or later-developed device or system for connecting the local data storage devices 120–130 to the protocol converter 700, including a direct cable connection, a data bus, a connection over a wide area network or a local area network, a connection over an intranet, a connection over the Internet, or a connection over any other distributed processing network or system. In general, the links 55 can be any known or later-developed connection system or structure usable to connect the local data storage devices 110–130 to the protocol converters 700.

Internal to the data production site 100, the recovery site 600, and the point of presence 550, a channel protocol is used to transmit data from each of the local data storage devices 110–130 to the protocol converter 700. Each protocol converter 700 converts the channel protocol into a carrier protocol. The carrier protocol allows one computer, or network of computers, for example, a local area network internal to the data production site 100, to view a noncollocated data storage device, such as the local data storage device 120 located at the data storage facility 500, as if the data storage facility 500 were collocated with the data production site 100.

For example, with reference to FIG. 2, the data production site 100 initiates a back-up procedure. Data from the local data storage device 110 is transferred via the link 55 to the protocol converter 700. The protocol converter 700 converts the channel protocol that is used to manipulate data within the data production site 100 to the carrier protocol. The carrier protocol is then used to manipulate the local access network 300 to route the back-up data to the data storage facility 500. Upon the data arriving at the point of presence 550, the point of presence protocol converter 700 translates the carrier protocol back to channel protocol. The data can then be transmitted and stored via the link 55 to the local data storage device 120. Thus, even though the local data storage device 120 is physically separate from the data storage device 110, the computer or server managing the storage of data at the local data storage device 110 "sees" the local data storage device 120 as being "in the network."

For example, if the data production site 100 is a computer system operating on a local area network, with disk drives A–D, the local data storage facility 120 could appear as a drive "E" on the computers in the local area network of the data production site 100. Therefore, a user at the data production site 100 is oblivious to the fact that data is being stored to an off-site location.

As previously noted., the protocol converter 700 converts the channel protocol, which is used to manipulate data between local storage devices, to the carrier protocol. Standard carrier protocol, using channel extension technology, such as that used by SRDF's EMC ENTERPRISE STORAGE SYSTEM, allows information sharing at data storage sites either collocated or noncollocated with a production site.

However, the EMC ENTERPRISE STORAGE SYSTEM only allows data mirroring and back-up to specific, pre-identified data storage sites over dedicated transmission lines.

By adding routing information to the carrier protocol, the remote electronic vaulting methods and systems of this invention allow the user, for example, the network manager at the data production site 100, or alternatively, for example, a network recovery manager at the recovery site 600, to directly manipulate the transmission path or paths of back-up or recovery. For example, a user at the data production site 100 could specify the daily back-ups are to occur, via the local access network 300, to the data storage facility 500 located at the local point of presence 550. Then, for example in the case of a major impact event, the back-up data stored at the point of presence 550 can be recovered, at the direction of a user at the recovery site 600, via the long-haul network 400 and the local access network 300 to the recovery site 600.

Figure 3:
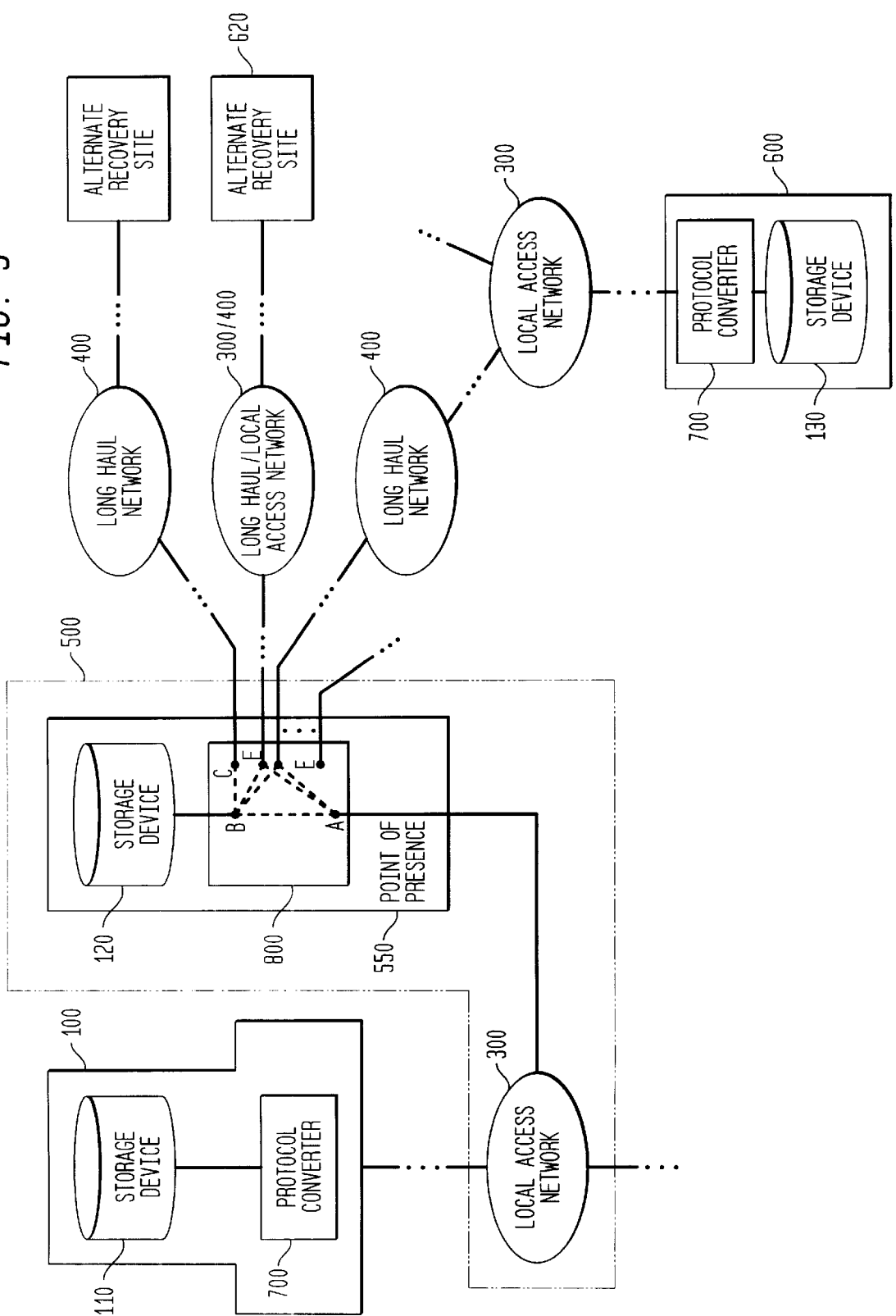
FIG. 3 shows a third exemplary embodiment of the remote electronic vaulting system according to this invention.

FIG. 3 illustrates in greater detail how carrier protocols are used to manipulate data transfer and routing over a plurality of networks. Specifically, FIG. 3 illustrates how channel protocols allow a user to perform switching at the point of presence 550 to control, the location for example, from which the back-up data is recovered. Specifically, the point of presence 550 comprises a switch service 800. The switch service 800 is capable of connecting the data production site 100 to one or more long-haul networks 400, one or more local access networks 300 and/or to the local data storage device 120.

Specifically, the channel protocols establish the connection between the various nodes, for example, A–E, in the switch service 800. For example, during a routine backup procedure, a user can specify in the channel protocol that the switch service 800 is to connect nodes A and B. Thus, a direct connection would be established between the data production site 100 and the local storage device 120 located at the off-site storage facility.

Alternatively, for example, if a user desires to mirror the data stored at the data production site 100, the user could direct the switch service 800, again via the channel protocols, to connect the nodes A and E. Thus, a direct connection would be established from the data production site 100, via the data storage facility 500, the long-haul network 400 and one of the local access networks 300 to the recovery site 600. Therefore, the storage device 130 at recovery site 600 would be viewed as internal to the network operating at the data production site 100.

Furthermore, if for example, the local access networks 300 are not available, a user at an alternative recovery site 620 can manipulate the switch service 800 to connect nodes B and D. Therefore, the user at the alternative recovery site 620 can recover data directly from the data storage facility 500 and the local storage device 120. Again, in this exemplary scenario, the local storage device 120 is viewed as being "in the network" by the alternate recovery site 620.

The point of presence 550 is the location in each local access transport area that the local exchange carrier connects to a designated inter-exchange carrier. Thus, the switch service 800 is located at the point where the local telephone company terminates subscribers circuits for leased line or long-haul circuits. The point of presence 550, as previously indicated, houses the local data storage device 120 that provides the off-site storage capability. This architecture enables a user to copy critical data electronically from the data production site 100 and/or 200 to the data storage facility 500 located in the point of presence 550, store the data in electronic form on standard disk or tape storage devices, and recall, copy and/or recover that data anywhere. As previously explained, the subsequent electronic data transfer from the data storage facility 500 can be designed, for example, to move the critical data on demand at the time of a disaster to any disaster recovery facility, in the case of a major impact event, or, for example, back to the original production site, in the case of a limited impact event.

The switch service 800 connects at least one data production site to one or more long-haul networks, one or more local access networks and/or one or more local data storage devices. In general, the switch service 800 can be any known or later-developed switch system, structure or service usable to connect at least one data production site to one or more long-haul networks, one or more local access networks and/or one or more local data storage devices. The switch service 800 can be any known or later-developed device, system and/or service for connecting the at least one data production site 100 and/or 200 to one or more long-haul networks, one or more local access networks and/or one or more local data storage devices, including 800 services, switch 56, switch T1, accunet reserve, switch DS3, frame relay switches, Internet services, multiple central office switches and/or contracted switches.

Figure 4:
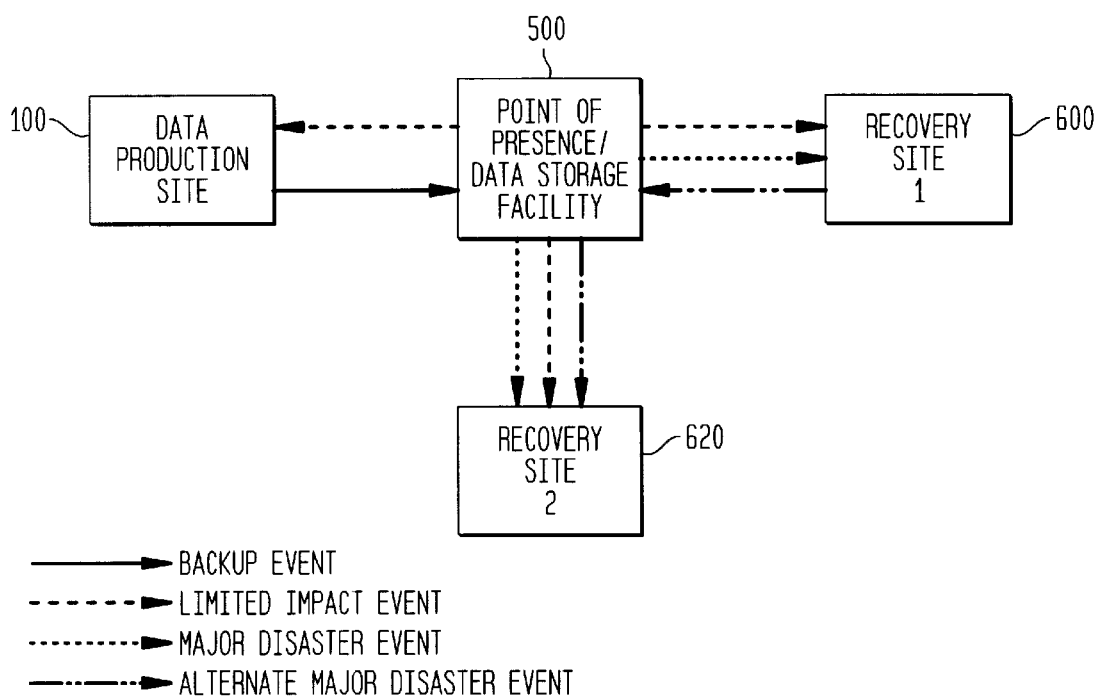
FIG. 4 shows a block diagram of exemplary data transfer scenarios.

FIG. 4 illustrates exemplary data transmission scenarios. For example, a back-up event can transfer data from the data production site 100 to the data storage facility 500 collocated at the point of presence. In the case of a limited impact event, the backed-up data can be transmitted from the data storage facility 500 back to the data production site 100, or, alternatively, to a recovery site 600. In the event of a major disaster event, for example where the production site's local access network is not available, data can be transported to either the recovery site 600 or an alternate recovery site 620.

Alternatively, a second exemplary scenario for recovering back-up data after a major disaster event is to take data that is being produced at the recovery site 1 and store it at the point of presence. The data is then transmitted to the recovery site 2, which then becomes the new data production site. Thus, with the off-site storage facility being located "in the network," transmission of production data to alternative recovery sites can be accomplished as readily as transmitting or recovering to the data production site or the primary recovery site.

Figure 5:
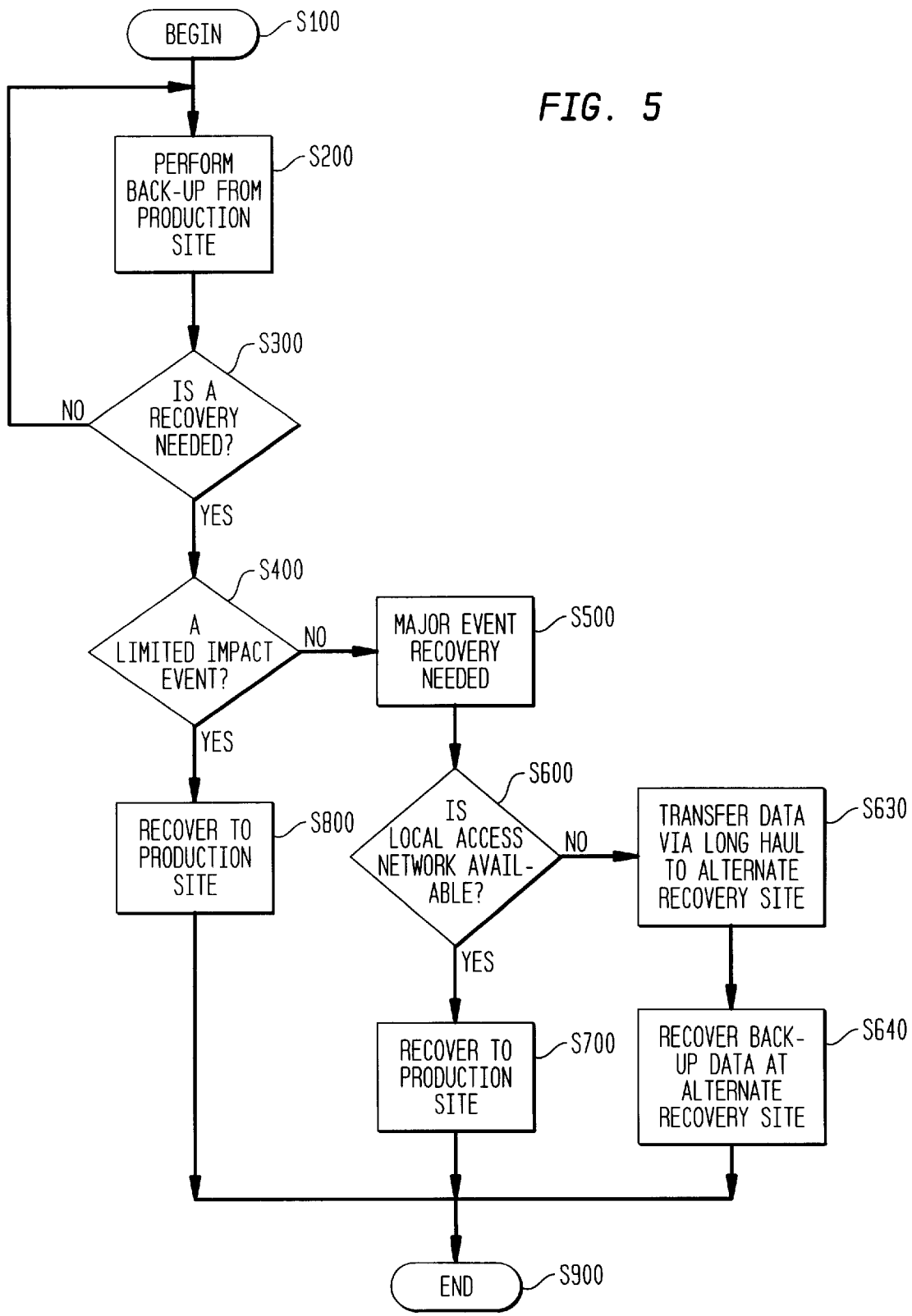
FIG. 5 shows an exemplary method of data back-up and recovery according to this invention.

FIG. 5 illustrates one exemplary method for manipulating the transmission of data during back-up and recovery procedures. Control begins in step 100, and continues to step S200, where data is backed-up from the production site to an off-site storage facility collocated at the point of presence. Next, in step S300, a determination is made whether a recovery is needed. If a recovery is not needed, control jumps back to step S200. Otherwise, control continues to step S400.

In step S400, a determination is made whether the event is a limited-impact event. If the event necessitating data recovery is a limited-impact event, control jumps to step S800. Otherwise, control continues to step S500. In step S500, the remote electronic vaulting system is notified that recovery from a major-impact event is needed. Next, in step S600, a determination is made whether the local access network for the data production site is available. If the local access network for the data production site is available, control jumps to step S700. Otherwise, control continues to step S630.

In step S630, data is transferred from the data storage facility via, for example, the long-haul network, to an alternate recovery site. Then, in step S460, the recovered back-up data is available at the alternate recovery site. Control then continues to step S900.

In contrast, in step 700, back-up data is transmitted via the local access network back to the original production site. Control then continues to step S900.

In step S800, data is transmitted back to and recovered at the original production site. Control then continues to step S900, where the control sequence ends.

Figure 6:
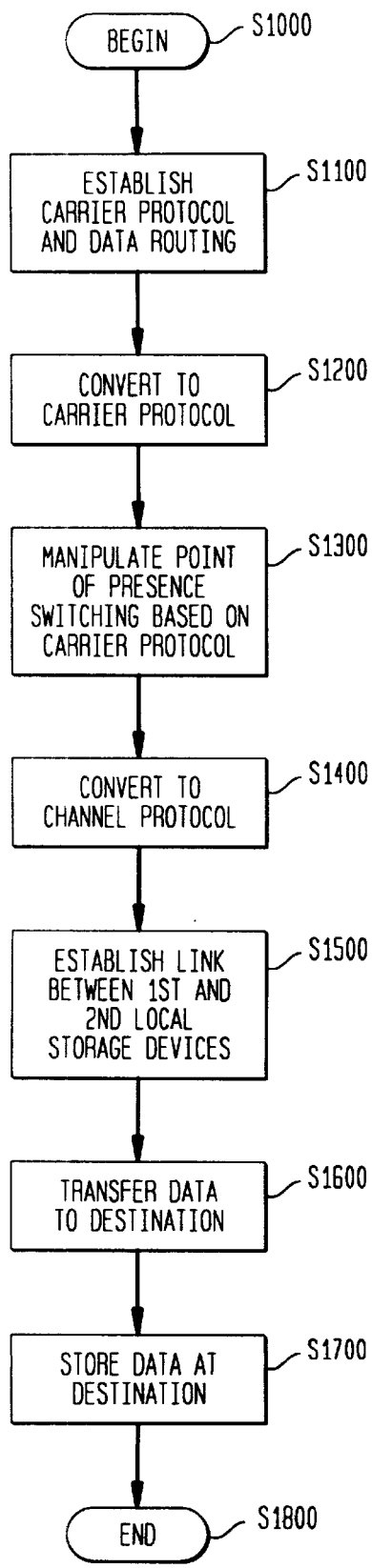
FIG. 6 illustrates an exemplary method for controlling the transmission of data during back-up and recovery procedures.

FIG. 6 illustrates one exemplary method for controlling the transmission of data during back-up and recovery procedures. Control begins in step S1000, and continues to step S1100 where, a carrier protocol is established that controls the data routing during a back-up or recovery event. Next, in step S1200, the channel protocol of a first local storage device is converted to carrier protocol. Then, in step S1300, switching in the point of presence is manipulated based on the carrier protocol. Control then continues to step S1400.

In step S1400, the carrier protocols are converted back to channel protocols for a second local storage device. Then, in step S1500, a link is established between the first and second local storage devices. Next, in step S1600, data is transferred from the first local storage device to the second local storage device. Control then continues to step S1700

In step S1700, the data from the first local storage device is stored at the second local storage device. Control then continues to step S1800, where the control routine ends.

As shown in FIGS. 1–4, remote electronic vaulting systems of this invention may preferably be implemented on one or more general purpose computers. Also, a dedicated expert system processor may be included. However, other hardware/software implementations such as a special purpose computer, a programmed microprocessor or microcontroller, and peripheral integrated circuit elements, an ASIC or other integrated circuit, a digital signal processor, a hard-wired electronic or logic circuit such as a discreet circuit, a programmable logic circuit such as a PLD, PLA, PGA, FPGA, PAL or the like are possible. In general, any device capable of implementing a finite state machine which is in turn capable of implementing the flowcharts shown in FIGS. 5 and 6 could be used to implement the remote electronic vaulting system.

Finally, all the connections that couple system components together can be any wired or wireless link capable of connecting the devices described herein.

While this invention has been described in conjunction with preferred embodiments thereof, it is evident that many alternatives, modifications and variations be apparent to those skilled in the art.

What is claimed is:

1. A method for backing-up and/or restoring data, comprising:
   collocating a back-up data storage facility and a point of presence;
   storing back-up data in the back-up data storage facility;
   controlling routing of the back-up data at the point of presence; and
   transmitting the back-up data in accordance with routing information.

2. The method of claim 1, wherein controlling the routing of data comprises:
   adding the routing information to a carrier protocol; and
   manipulating a switch service based on the routing information.

3. The method of claim 2, wherein the switch service is collocated with the point of presence.

4. The method of claim 1, further comprising;
   converting a channel protocol to a carrier protocol at a first storage device;
   converting the carrier protocol to a channel protocol at a second storage device; and
   establishing a link between the first storage device and the second storage device.

5. The method of claim 4, further comprising:
   transferring the data from the first to the second storage device; and
   storing the data in the second storage device.

6. The method of claim 1, wherein the data is transmitted from at least one first location to a data storage facility.

7. The method of claim 6, wherein the at least one first location is a data production site.

8. The method of claim 6, wherein the data is transmitted from the data storage facility to the first location.

9. The method of claim 6, wherein data is transmitted from the data storage facility to at least one second location.

10. The method of claim 9, wherein the at least one second location is a recovery site.

11. The method of claim 6, wherein the data is transmitted from at least one second location to the data storage facility.

12. A method for routing back-up and/or recovery of data, comprising:
   converting a channel protocol to a carrier protocol;
   manipulating a switch service based on the carrier protocol to obtain a route; and
   routing back-up data based on the route.

13. The method of claim 12, wherein the switch service is collocated with a point of presence.

14. The method of claim 12, wherein the switch service is at least one of an 800 service, a switch 56, a switch T1, an accunet reserve, a switch DS3, a frame relay switch, an Internet service, at least one central office switch or contracted switching.

15. The method of claim 12, further comprising converting the carrier protocol to a channel protocol.

16. The method of claim 15, further comprising establishing a link between a first data storage device and a second data storage device.

17. The method of claim 16, further comprising transmitting data from the first storage device to the second data storage device.

18. The method of claim 16, wherein at least one of the first and second data storage devices is collocated with a point of presence.

19. A system for back-up and/or recovery of data, comprising:
   a point of presence; and
   a back-up storage device collocated with the point of presence that receives back-up data from at least one data production site.

20. The system of claim 19, further comprising a switching service.

21. The system of claim 20, wherein the switching service routes the data from the at least one data production site to the storage device.

22. The system of claim 20, wherein the switching service routes the data from the at least one data production site to at least one data recovery site.

23. The system of claim 20, wherein the switching service routes the data from the storage device to at least one data recovery site.

24. The system of claim 20, wherein the switching service routes the data based on routing information.

25. The system of claim 24, wherein the routing information is associated with a carrier protocol.

* * * * *